March 13, 1934.                G. A. BIGGS                1,950,774
                            HYDRAULIC TURBINE
                            Filed June 21, 1932
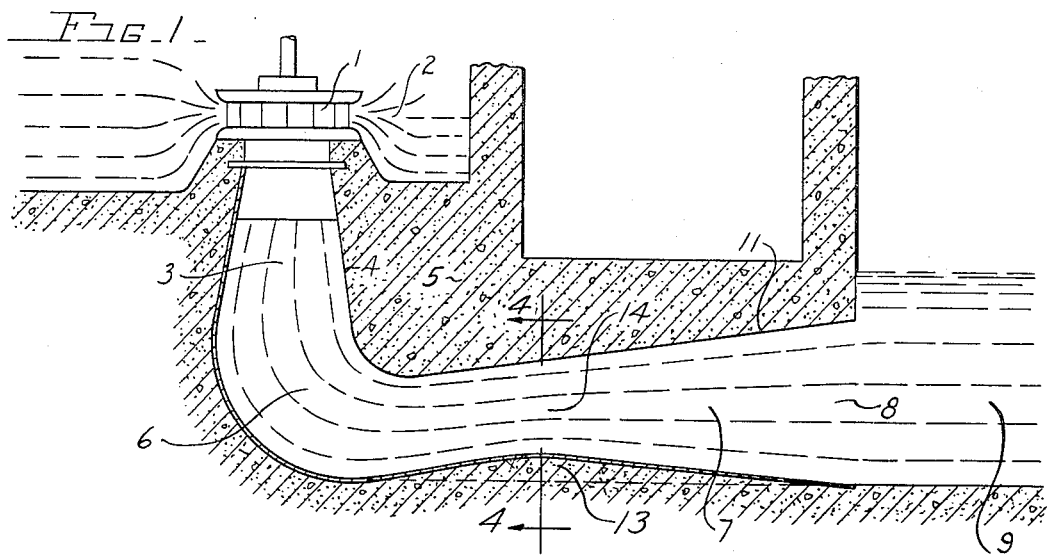
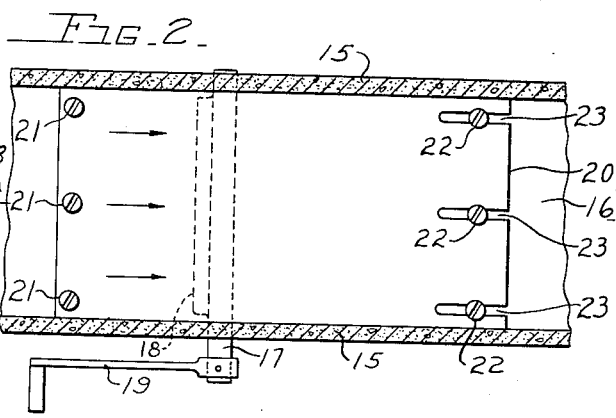
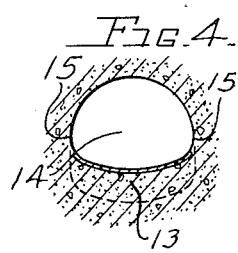
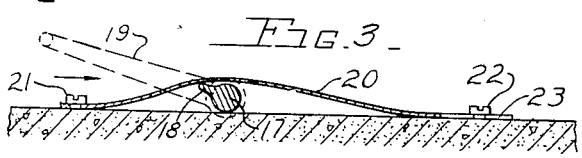
INVENTOR
George A. Biggs.
BY
ATTORNEYS Patented Mar. 13, 1934

1,950,774

UNITED STATES PATENT OFFICE 1,950,774

HYDRAULIC TURBINE

George A. Biggs, Springfield, Ohio, assignor to The James Leffel & Company, Springfield, Ohio, a corporation of Ohio Application June 21, 1932, Serial No. 618,496

11 Claims. (Cl. 253—117)

My invention relates to hydraulic turbines, and, in particular, to the configuration and form of the draft tube.

Heretofore, very considerable difficulty has been encountered in all draft tubes in that in the elbow type of draft tube the water descending from the turbine when it is deflected to a horizontal flow by the elbow of the draft tube has greater velocity along the outer portion of the curved path and along the bottom of the horizontal flow than on the inner portion of the elbow and the top of the horizontal flow.

This weaker current on the inner portion of the elbow and the top of the horizontal flow has a tendency to reduce the draft tube efficiency, due to the turbulence set up on the top of the horizontal flow in the expanding mouth of the draft tube.

It is my object to provide a draft tube in which the flow shall be uniform throughout the entire tube, particularly the horizontal discharge portion thereof.

It is my object to so provide a form of construction of draft tube that will prevent the water in the tail race from running back into the top of the draft tube stream as it makes its exit causing turbulence and resistance to the exit of the water from the draft tube, which has heretofore been a characteristic of this type of draft tubes and as to which there has been no remedy.

In particular, it is my object to provide a draft tube in which the discharge shall be through a restricted throat, preferably of Venturi form, with a restriction at the bottom of the horizontal portion of the draft tube so as to impede the velocity at that point as compared with the velocity of the water at the top of the tube at that point so as to provide a uniform rate of flow throughout the entire tube as the water makes its exit to thereby prevent turbulence, return flow from the tail race and resistance to the flow of the water from the draft tube.

Referring to the drawing:

Figure 1 is a section indicating an installation of a turbine in connection with a draft tube of the present invention;

Figure 2 is a horizontal section through a modified form of draft tube;

Figure 3 is a section on the line 3—3 thereof;

Figure 4 is a section on the line 4—4 of Figure 1.

Referring to the drawing in detail, 1 indicates a diagrammatic view of a hydraulic turbine into which the water is flowing from the head waters 2. The water descends through the vertical portion 3 of the draft tube 4 which may be formed of metal or concrete as indicated at 5. The water then turns through the elbow and enters a horizontal discharge flow area generally designated 7, whence it makes its exit at 8 into the tail waters 9.

Referring to Figure 1, it will be noted that there is a rise in the bottom floor of the draft tube as at 13 which is a feature of my invention, so that I restrict the flow of water through the draft tube as at 14 causing the water to flow upwardly to fill the space 8 uniformly so that there is no turbulence or return flow in the area 12. The draft tube beyond the hump or restriction 13 and the throat 14 is substantially a Venturi-shaped, expanding type of construction permitting the free flow of water uniformly throughout the area 8 into the tail waters 9. The restriction 13 I have found directs the water flowing through the throat 14 so that an even amount of water flows throughout the entire area 8 particularly directing the water into the area 12 where heretofore the turbulence occurred.

Referring to the forms shown in Figures 2 and 3 I have shown diagrammatically an adjustable form of exit tube which permits of the adjustment of the throat 14 in accordance with the flow of water through the turbine in order to accommodate the size of the throat to different amounts of water flow as to the water flow varies throughout the season.

The tube walls 15 are provided with a bottom 16 across which is arranged the operating shaft 17 having an operating flange 18. The shaft 17 is operated by any suitable operating means, such as a handle 19. A flexible plate member 20 is attached at 21 on the inlet side of the tube to the bottom of the tube 16 and is slidably connected by the studs 22 on the bottom 16 operating in the slots 23 of the plate 20 so that, as the shaft 17 is rotated, the engagement of the operating flange 18 may raise or lower the flexible member 20 to restrict the throat 14.

It will be understood that I desire to comprehend within my invention such modifications as may be necessary to adapt it to varying conditions and uses.

Having thus fully described my invention, what I claim as new and desire to secure by Letters Patent, is:—

1. A new article of manufacture for use as a draft tube of a hydraulic turbine comprising means forming a vertically-disposed passageway from the turbine, and means comprising a horizontally-disposed passageway connecting with the vertical passageway by an elbow and an adjustable restriction adjacent the elbow in the horizontal passageway for the purpose of varying the cross sectional area of the passageway to deflect water upwardly and outwardly against the upper wall of the draft tube.

2. A new article of manufacture for use as a draft tube of a hydraulic turbine comprising means forming a vertically-disposed passageway from the turbine, and means comprising a horizontally-disposed passageway connecting with the vertical passageway by an elbow and an adjustable restriction adjacent the elbow in the horizontal passageway for the purpose of varying its cross sectional area to deflect water upwardly and outwardly against the upper wall of the draft tube, said horizontal passageway flaring towards the discharge opening from the point of restriction.

3. In a new article of manufacture for use as a hydraulic turbine draft tube, means to form a horizontal passageway connected by an elbow, said horizontal passageway having an adjustable restriction forming a Venturi throat at its entering end adjacent the elbow, the restriction being adjustable for the purpose of varying the cross sectional area of the draft tube to deflect water upwardly and outwardly against the upper wall of the draft tube and a flaring mouth adjacent its discharge end.

4. In a new article of manufacture for use as a hydraulic turbine draft tube, means forming a vertically-disposed water discharge passageway, and means connected thereto by an elbow forming a horizontal discharge passageway, and adjustable means in the entering end of said horizontal passageway to deflect the water issuing from the elbow upwardly and outwardly against the upper wall of the horizontal portion of the draft tube.

5. A new article of manufacture for use as a hydraulic turbine draft tube, means forming a vertically-disposed, downwardly-directed and expanding portion, an elbow portion and a horizontal portion, said horizontal portion having adjustable means to restrict the area of flow between the elbow and the horizontal portion to deflect the water upwardly towards the top of the horizontal portion.

6. A new article of manufacture for use as a hydraulic turbine draft tube, means forming a vertically-disposed, downwardly-directed and expanding portion, an elbow portion and a horizontal portion, said horizontal portion having adjustable means to restrict the area of flow between the elbow and the horizontal portion to deflect the water upwardly towards the top of the horizontal portion, the walls of said horizontal portion being so arranged as to increase the diameter thereof outwardly towards the discharge end.

7. An elbow draft tube having a vertical portion and a substantially horizontal portion, and a longitudinally extending adjustable plate in the horizontal portion adjacent the elbow.

8. An elbow draft tube having a vertical portion and a substantially horizontal portion, a plate in the horizontal portion fixed at one end to the tube and slidably attached at its other end to the tube, and means to adjust the plate intermediate its ends.

9. An elbow draft tube having a vertical portion and a substantially horizontal portion, a plate in the horizontal portion fixed at one end to the tube and slidably attached at its other end to the tube, and means to adjust the plate intermediate its ends, said means consisting of a shaft having a flange thereon.

10. An elbow draft tube having a vertical portion and a substantially horizontal portion, a plate in the horizontal portion having one end fixed to the tube and its other end slidably attached to the tube, and means between the plate and the adjacent part of the tube to vary the size of the tube.

11. In a draft tube, a downwardly and outwardly flaring portion, a right angle portion and a laterally and outwardly flaring portion, said latter portion having a restricted throat, the top of which is semi-circular described about the center of the draft tube at the point of restriction and the bottom of the draft tube being slightly arcuate and described upon a center outside of the draft tube whereby it is nearly flat.

GEORGE A. BIGGS.